United States Patent
Harris et al.

(10) Patent No.: US 12,037,948 B2
(45) Date of Patent: Jul. 16, 2024

(54) PLASMA IGNITION AND COMBUSTION ASSIST SYSTEM FOR GAS TURBINE ENGINES

(71) Applicant: Acutronic Turbines Inc., Austin, TX (US)

(72) Inventors: Mark Harris, Palm Beach Gardens, FL (US); Patrick Bailey, Hutto, TX (US); David Monk, Hutto, TX (US); Felipe Gomez del Campo, Boston, MA (US); Drew Weibel, Dorchester, MA (US); Ilya Gulko, Richmond Hts, OH (US); Munetake Nishihara, Cambridge, MA (US); Ford McClure, West Palm Beach, FL (US)

(73) Assignee: Acutronic Turbines Inc., Austin, TX (US)

( * ) Notice: Subject to any disclaimer, the term of this patent is extended or adjusted under 35 U.S.C. 154(b) by 0 days.

(21) Appl. No.: 18/186,161

(22) Filed: Mar. 18, 2023

(65) Prior Publication Data
US 2023/0392553 A1    Dec. 7, 2023

Related U.S. Application Data

(63) Continuation of application No. 17/676,992, filed on Feb. 22, 2022, now Pat. No. 11,725,587.
(Continued)

(51) Int. Cl.
*F02C 7/266* (2006.01)
*F23R 3/16* (2006.01)

(52) U.S. Cl.
CPC ............... *F02C 7/266* (2013.01); *F23R 3/16* (2013.01); *F05D 2260/99* (2013.01); *F23R 2900/00008* (2013.01)

(58) Field of Classification Search
CPC .. F02C 7/264; F02C 7/266; F02C 9/28; F23R 3/16; F05D 2260/99
See application file for complete search history.

(56) References Cited

U.S. PATENT DOCUMENTS

| | | | | |
|---|---|---|---|---|
| 5,515,681 A | * | 5/1996 | DeFreitas | F23D 11/42 60/39.821 |
| 5,587,630 A | * | 12/1996 | Dooley | F02P 15/10 315/209 T |

(Continued)

FOREIGN PATENT DOCUMENTS

| | | | |
|---|---|---|---|
| JP | 5515681 B2 * | 6/2014 | |
| WO | WO-2022036012 A1 * | 2/2022 | G03B 21/565 |

(Continued)

OTHER PUBLICATIONS

Chemtronics, p. 2 brochure on Gas Turbine ignition Systems.
(Continued)

*Primary Examiner* — Craig Kim
(74) *Attorney, Agent, or Firm* — Karen Tang-Wai Sutton (57) ABSTRACT

An ignition and combustion assist system and method comprising a plasma igniter and electronic driver unit for use with gas turbine engines operating under low air densities, reduced voltage conditions and overall pressure ratios of 3:1 to 7:1. The plasma igniter has an inner chamber housing a centrally positioned and electrically isolated electrode attached to an electrical lead, driver unit, and AC or DC power supply. The electrode features a corner positioned near an outlet end of the igniter, where a plasma arc ignites a fuel-air mixture creating a flame extending into a primary burn region of a combustor of the gas turbine. The driver unit is in two embodiments and configured with low-cost microsecond voltage wave time periods or energy-efficient nano-second pulses. The method uses the plasma igniter and
(Continued)

the electronic driver units described herein separately with other components or together.

4 Claims, 8 Drawing Sheets

Related U.S. Application Data (60) Provisional application No. 63/153,022, filed on Feb. 24, 2021.

(56) References Cited

U.S. PATENT DOCUMENTS

| | | | | |
|---|---|---|---|---|
| 5,640,841 | A * | 6/1997 | Crosby | F02C 7/264 60/776 |
| 5,845,480 | A * | 12/1998 | DeFreitas | F02P 23/04 60/776 |
| 6,206,307 | B1 * | 3/2001 | Kelly | B05B 5/10 239/690 |
| 7,080,504 | B2 * | 7/2006 | Pais | F23R 3/00 60/39.821 |
| 8,371,102 | B1 * | 2/2013 | Lee | F02C 9/28 356/939 |
| 9,255,549 | B1 * | 2/2016 | Brown | F02K 9/00 |
| 9,441,834 | B2 * | 9/2016 | Colannino | F23C 99/001 |
| 10,197,281 | B2 * | 2/2019 | Dolmansley | F23R 3/343 |
| 11,543,130 | B1 * | 1/2023 | Ryon | F02C 7/264 |
| D1,010,759 | S * | 1/2024 | Gearing | D14/251 |
| 2006/0175306 | A1 * | 8/2006 | Prociw | F02C 7/264 219/121.57 |
| 2007/0182336 | A1 * | 8/2007 | Peschel | H05H 1/46 315/111.21 |
| 2009/0145398 | A1 * | 6/2009 | Kemeny | F02M 26/36 123/25 C |
| 2020/0018239 | A1 * | 1/2020 | Ramamurthi | H01T 15/00 |
| 2022/0333531 | A1 * | 10/2022 | Harris | F02C 7/266 |
| 2023/0392553 | A1 * | 12/2023 | Harris | F23R 3/16 |

FOREIGN PATENT DOCUMENTS

| | | | | |
|---|---|---|---|---|
| WO | WO-2022182622 | A1 * | 9/2022 | F02C 7/266 |
| WO | WO-2023245146 | A1 * | 12/2023 | |

OTHER PUBLICATIONS

Champion Aerospace, CFM56/CF6 Ignition System 2 page brochure.
Unison, High Performance Igniter, 1 page brochure.
Champion Aerospace, Characterization and Benefits of High and Low Tension (Voltage) Ignition System Designs Background Information 4 page brochure.
Lefebvre, Arthur, Gas Turbine Combustion, Third Edition, pp. 188-199.
Unison, Solid Tate Ignition Exciters 2 page brochure.

* cited by examiner

PLASMA IGNITION AND COMBUSTION ASSIST SYSTEM FOR GAS TURBINE ENGINES

CROSS-REFERENCE TO RELATED APPLICATIONS

This application claims priority to and benefit from U.S. provisional application Ser. No. 63/153,022 filed 24 Feb. 2021, claimed under all applicable sections of Title 35 of the United States Code including, but not limited to, Sections 120, 121, and 365(c), and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention relates to ignition systems for turbine engines. More particularly, the invention is a plasma ignition system with an electronic driver unit and one or more igniter components for use with a variety of gas turbine engine applications and particularly with miniature turbojets and miniature high-speed turbo generators with relatively low pressure ratios from 3:1 to 7:1 overall.

Background Art

All combustion engines have an air-fuel mixture inside the combustor that is ignited, the hot air generated in the combustor used to then turn blades of a turbine, piston, etc. Current ignition systems such as spark igniters rely on multiple factors for combustion to take place: stoichiometry, gas pressure, timing of the spark generated, and the voltage applied to create a sufficiently large spark must all be carefully calculated and calibrated to maximize performance and reliability.

One problem with current igniter systems is the fact that they are generally unsuitable for miniature lightweight engines, defined as those engines with diameters less than 16 inches and weights of less than 25 lbm, such as those used with lightweight drones, miniature missiles, airborne jamming devices, etc. as the cost, size (exciter electronics larger than a 3 inch cube) and weight (more than 1.0 lbm) of current igniter systems render them unsuitable. Smaller applications such as drones ideally need lighter and lower power components and accordingly favor ignition systems that are simple, lightweight, with relight/restart capability and are flexible according to the specific application needs.

The need for improved combustion system operability (stability over a wider range of fuel/air mixtures, at higher flame strain rates and shorter residence times), as well as limitations of prior art igniter systems have created intense interest in research using plasma igniters and suitable applications of this technology, including use with internal combustion engine and dual fuel engines. For small gas turbines such as those used in drones, and which operate with under low pressure ratios and low combustor inlet temperatures the performance of current igniter systems is lacking. The cost and limited performance of traditional spark ignition systems and pyrotechnic flare igniters have resulted in the need for a better system for achieving light-off, including re-light, with low-cost components.

What is needed is a plasma ignition and combustion assist system comprising a plasma igniter and an electronic drive unit that can be used with small gas turbine engines and a method of using a plasma igniter system having an ability to choose between more energy efficient applications and those that are more cost effective. What is also needed is a plasma igniter that generates a continuous electrical arc. What is also needed is an ignition system that can operate at lower voltage levels than conventional spark systems and yet deliver a higher energy output to the combustor. What is also needed is a plasma igniter that extends the plasma arc into the combustor's primary burn area, improving fuel burning efficiency. What is also still needed is an ignition system that has multiple re-light capability.

DISCLOSURE OF THE INVENTION

A plasma ignition and combustion assist system and method of using a plasma igniter and an electronic driver unit with a gas turbine engine operating under low temperature, low pressure ratios, and other conditions inappropriate for conventional spark systems. The plasma igniter and the electronic driver unit are lightweight and appropriate for use in drones, and other applications that require multiple re-light capability, as well as low-cost and higher efficiency options. The plasma igniter and the electronic driver unit in the method can be used together or separately with other igniter and driver units.

In a first aspect of the plasma ignition system, the plasma igniter is comprised of a substantially cylindrical igniter body having a lead end and an outlet end, with an inner wall defining a chamber between the ends. An electrode having a proximal end and at least one of a conical and cylindrical distal end is housed centrally inside the chamber so as to be electrically isolated from the inner wall, forming an approximately annular air gap within the chamber around the electrode. The igniter body is electrically grounded to the combustor, or directly to the igniter driver electronics via an insulated wire. A diameter of the electrode is between about 0.125 and 2.0 inches. The electrode distal end is positioned towards the outlet end of the igniter body and is further formed with at least one corner having a corner radius ranging from zero to 0.15 inches. The corner in some embodiments is configured as a projection. An arc gap from the corner to the inner wall of the igniter body ranges from a shortest or smallest distance from the corner to the inner wall to a shortest or smallest distance measured to the inner wall at the outlet end. In some embodiments, the arc gap is between about 0.125 inches to about 0.75 inches, and in other embodiments, the arc gap measures between about 0.04 and 0.5 inches. An electrical lead connects to the electrode to the driver unit and power supply. An air feed through-hole in the igniter body allows air flow into the air gap and exit the outlet end, forcing a plasma arc generated at the arc gap into the primary burn region of a combustor of the gas turbine engine. In some embodiments, the air feed through-hole is sized and shaped to support an air injection velocity ranging from about 50 to 300 ft/sec.

In another aspect of the plasma igniter, at least one of a fuel feed port, which may be a simple orifice, and a fuel feed port and a fuel atomizing injector integral with the igniter body is included. In some embodiments, the fuel feed port is sized and shaped to control at least one of a fuel velocity of a quantity of fuel entering the arc gap ranging from about 5 to 300 ft/sec and an inlet pressure ranging from 2.5 psia to 100 psia. In other embodiments, the quantity of fuel entering the annular arc gap enters as fuel droplets with a mean diameter greater than 80 microns.

In yet another aspect of the plasma igniter, the air feed through-hole is positioned between the insulator and the outlet end of the igniter body, whereby air entering the air gap through the air feed through-hole forces an arc generated within the igniter body into the primary burn region of the combustor.

In yet another aspect of the plasma igniter has an igniter body selected from the group of igniter bodies including an extended length igniter body and a truncated igniter body.

In another aspect of the plasma igniter system, the driver unit comprises an input power controller, a voltage oscillator communicating with the input power controller, a transformer communicating with the voltage oscillator and the input power controller, an on-off switch communicating with the input power controller, and a power source providing at least one of alternating and direct current input to the driver unit. The driver unit provides an output of voltage and current to the electrode and is grounded to the engine or to the combustor. The input power is regulated, filtered and modulated by the input power controller. The voltage oscillator creates an electrical output waveform at a desired frequency and level. The transformer transforms the electrical output waveform generated by the voltage oscillator and generates a voltage level and voltage rate of change sufficient to create an electric arc.

In yet another aspect of the driver unit, the voltage and current supplied to the electrode are transient and a voltage wave time period is measured in at least one of nano-second pulses and micro-second pulses in a repetitive cycle.

In yet another aspect of the driver unit, the oscillating voltage output levels at the electrode range between about 250 Vrms to 7000 Vrms.

In still yet another aspect of the driver unit, the direct current power source with a voltage level between 10 Vdc and 120 Vdc to the driver unit provides current to a circuit generating a variable or constant frequency voltage wave at about 10 kHz to 10000 kHz.

In yet another aspect of the driver unit, the input power controller is at least one of a passive circuit with a single state for input and output and a voltage and current regulation system.

In yet another aspect of the driver unit, a voltage level increase of 100 to 1000 times the input voltage via a voltage transformer is produced by either an inductive electrical coil or a set of energy storage capacitors to achieve the oscillating voltage increase.

In a method of using the plasma igniter system having a plasma igniter and an electronic driver unit, the method comprises the steps of determining at least one of a desired size and weight of a plasma igniter based on engine size, space availability or kinetic application, determining a desired igniter electrode operating life, determining a desired power efficiency of the plasma igniter system, maintaining a power source compatibility of the plasma igniter system with that of the engine, determining engine pressure ratios, and determining whether the plasma igniter and driver unit will be operational only at initial ignition and start of the engine or at multiple times after initial ignition and start of the engine.

In another aspect of the method, the step of determining engine pressure ratios further comprises the steps of identifying engines having low pressure ratios between 3:1 to 7:1, small volumetric flow rates below 15 msec, and operating at temperatures below 400 Fahrenheit, and selecting electronic driver units with voltage outputs appropriate for at least one of the respective pressure ratios and volumetric flow rates, after the step of determining engine pressure ratios.

In yet another aspect of the method, the step of selecting electronic driver units further comprises the steps of sizing the arc gap in accordance to increased voltage requirements.

In still yet another aspect of the method, the method is used with a turbojet with thrust ranging from about 15 to 600 lbf.

In yet another aspect of the method, the method is used with a turbo-generator having a 5 to 100 kW electrical power output.

In yet another aspect of the method, the method is further comprised of the steps of operating the plasma igniter to sustain combustion or increase combustion efficiency when conditions where mixing and reaction times are short or where the fuel-air mixture in the combustor burn zone is outside conventional lean and rich flammability limits, after the step of determining whether the plasma ignition system will be operational at initial ignition and start of the engine only, or multiple times after initial ignition and start.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components.
100 plasma igniter
100a truncated body igniter
100b extended body igniter
10 igniter body
10a outlet end
10b lead end
10c outer wall
12 retention cap
10e mount
16 insulator
18 lead wire retention material
20 electrical lead
20a power end of electrical lead
20b electrode end of electrical lead
22 crimp or braze joint or solder
24 electrode
24a distal end of electrode
24b proximal end of electrode
24c terminal end or vertex of electrode
24d corner
26 arc gap
28 inner wall of chamber of igniter body
30 air gap
32 air feed hole
34 fuel feed hole
36 fuel feed line
40 combustor
42 primary burn region of combustor
44 combustor recirculation zone
50 electronic drive unit or electronic driver unit or driver unit or drive unit or driver or unit
52 on/off trigger
54 input power (AC or DC)
56 input power controller
58 zero-voltage switching block
60 flyback transformer
62 high voltage output
64 voltage oscillator and transformer block
70 flame

DETAILED DESCRIPTION

Figure 11:
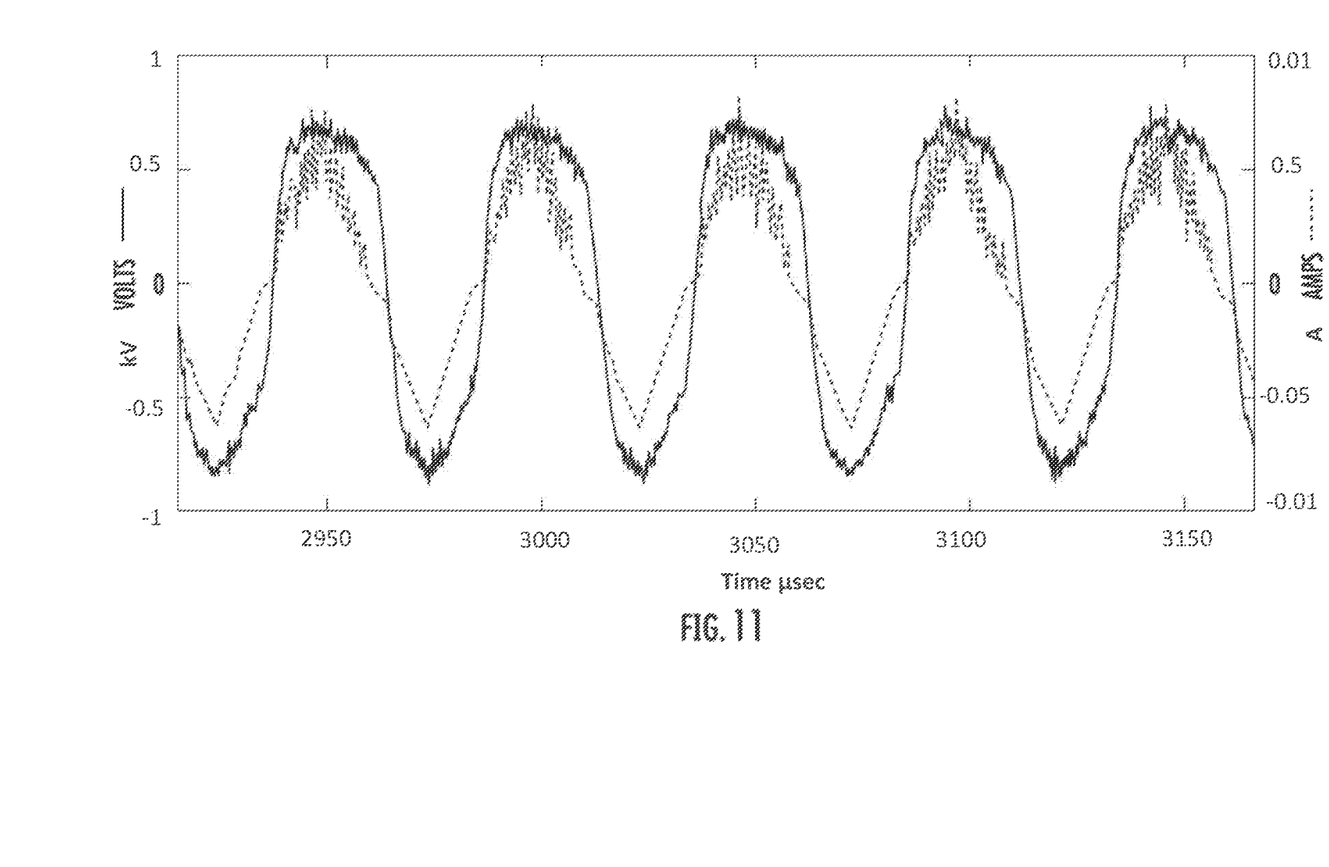
FIG. 11 is a representative electronic driver unit voltage and current output to the plasma igniter.
Figure 12:
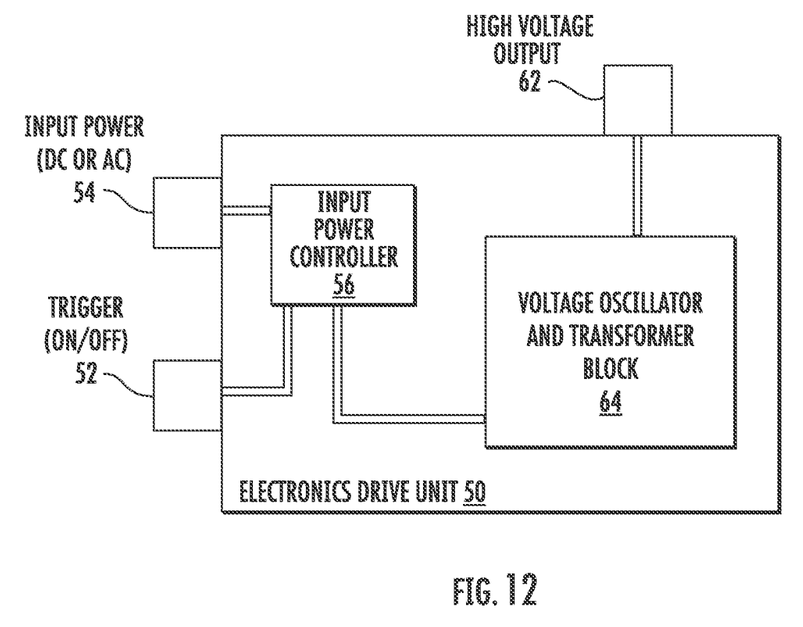
FIG. 12 is a first representative electronic driver unit configuration for use with a plasma igniter of the plasma ignition and combustion assist system.
Figure 13:
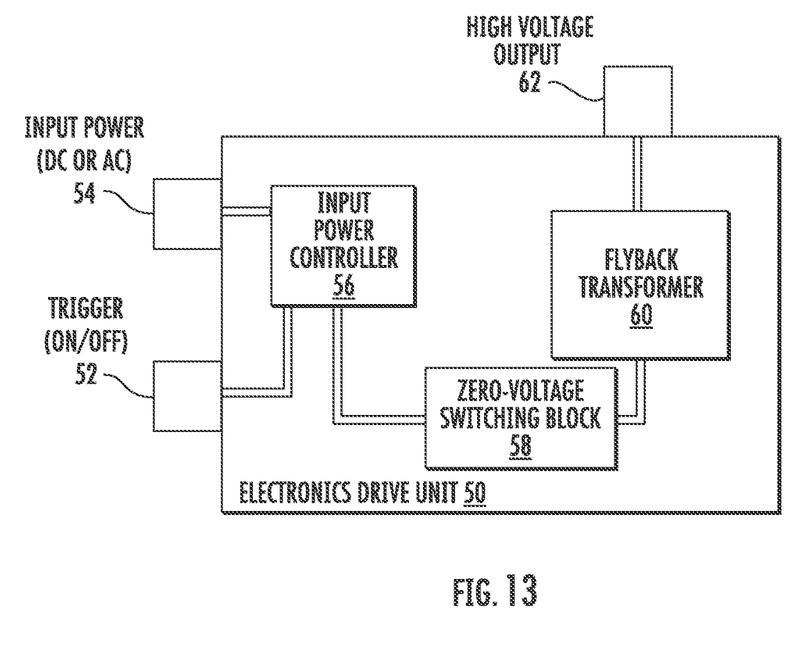
FIG. 13 is a second representative electronic driver unit configuration for a plasma igniter of the plasma ignition and combustion assist system.

A plasma ignition and combustion assist system for use with a gas turbine engine is comprised of a plasma igniter 100 in two embodiments, shown in FIGS. 1-10 and an electronic driver unit or drive unit or driver unit 50, in two embodiments, shown in FIGS. 11-13.

The plasma igniter 100 is comprised of an igniter body defined by an outer wall 10c and a pair of opposed open ends. The igniter body 10 is grounded to either the engine or a combustor 40 of the gas turbine engine. The igniter body 10 has an inner wall 28 defining an approximately cylindrical inner chamber having a lead end 10b enclosed by a retention cap 12 positioned over the lead end 10b and an opposed outlet end 10a. The retention cap 12 is formed with a hole sized and shaped to receive an electrical lead 20.

An electrode 24 having an approximately cylindrical shape, with a proximal end 24b and a distal end 24a, is connected at the proximal end 24b to an electrode end 20b of the electrical lead 20 by a solder or braze or crimp joint 22, with the joined electrode-electrical lead positioned inside the chamber through the hole in the retention cap 12. Note that the crimp joint 22 includes any other suitable connection and use of the term "crimp joint" is not meant to be limiting. The electrode 24 and electrical lead 20 are positioned centrally within the chamber and electrically isolated from the inner wall 28 of the igniter body 10 by a lead wire retention material or retention material 18, typically a quantity of potting or solder sandwiched between the inner wall 28 and the crimp joint 22, with a position of the electrical lead 20 secured by the retention material 18 around a perimeter of the electrical lead 20 and attached at one end to an interior side of the retention cap 12. An approximately annular air gap 30 is thus created between the inner wall 28 and the electrode 24 positioned centrally within the chamber. One or more through-holes or air feed holes 32 are formed into the igniter body wall leading from outside the igniter body 10 and into the air gap 30. A steady quantity of air generated by an air compressor is fed into the air gap 30 through the air feed hole 32. In some embodiments, an alternative or additional fuel feed port 34 is also formed into the igniter body 10 and leading into the air gap 30. The air feed hole 32 and the fuel feed port 34 are typically formed near the proximal end 24b of the electrode 24 however they may in fact be positioned anywhere between the outlet end 10a and the insulator 16 inside the chamber of the igniter body 10. The fuel feed port 34 may be configured as a simple orifice or may include with the port 34 a fuel atomizing injector integral with the igniter body 10. If the fuel feed port 34 is present, a fuel feed line 36 supplying fuel into the air gap 30 is affixed to the fuel feed port 34. A power end 20a of the electrical lead is attached to a power supply input 54 for supplying power to the igniter 100.

Figure 1:
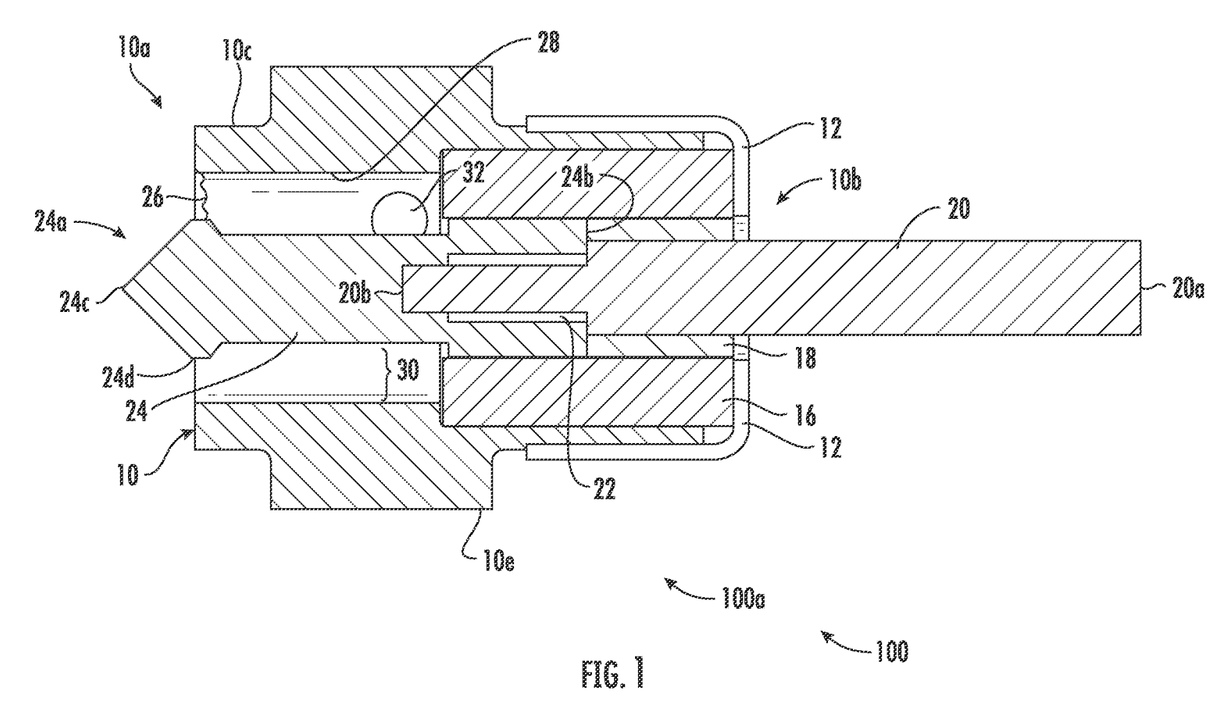
FIG. 1 is a side elevation cutaway view of a plasma igniter having a truncated body of a plasma ignition and combustion assist system.
Figures 4, 5, 6:
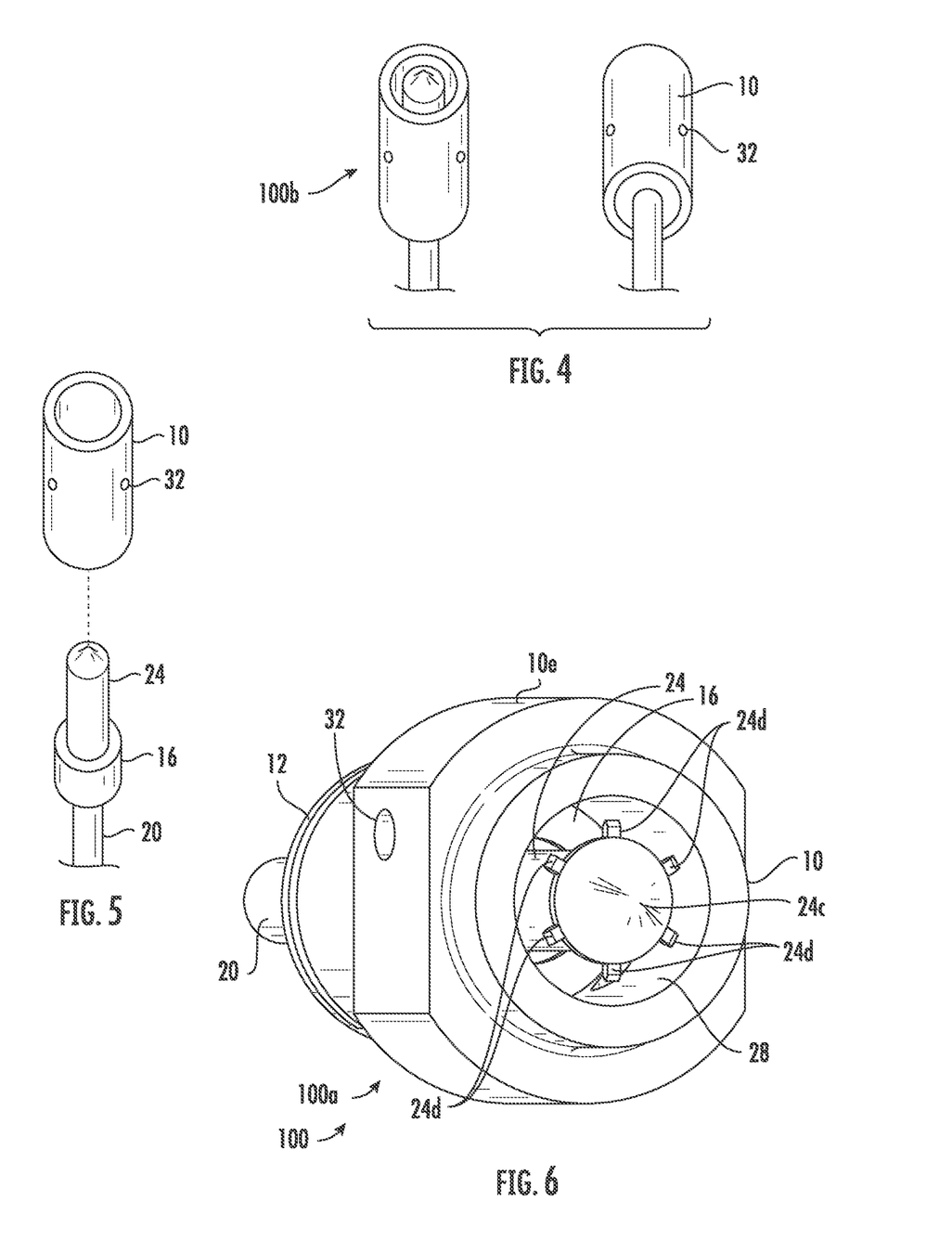
FIG. 4 is a perspective view of the plasma igniter in FIG. 2.
FIG. 5 is an exploded view of the plasma igniter in FIG. 4.
FIG. 6 is a perspective view of the plasma igniter in FIG. 1.
Figure 7:
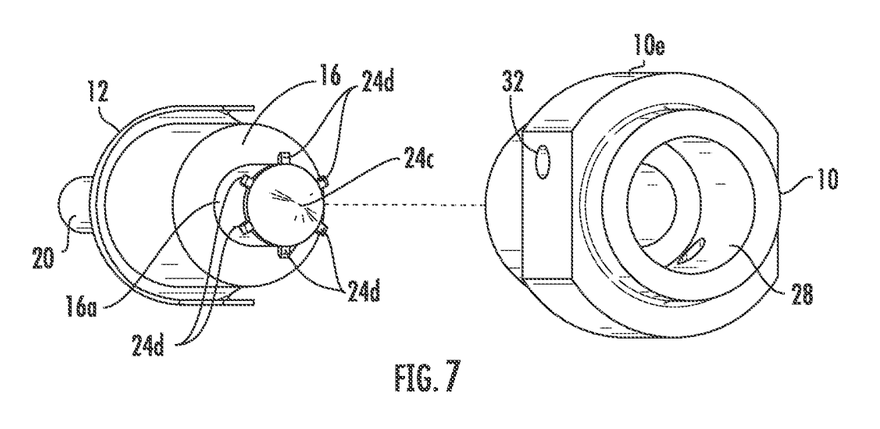
FIG. 7 is an exploded view of the plasma igniter in FIG. 6.
Figure 8:
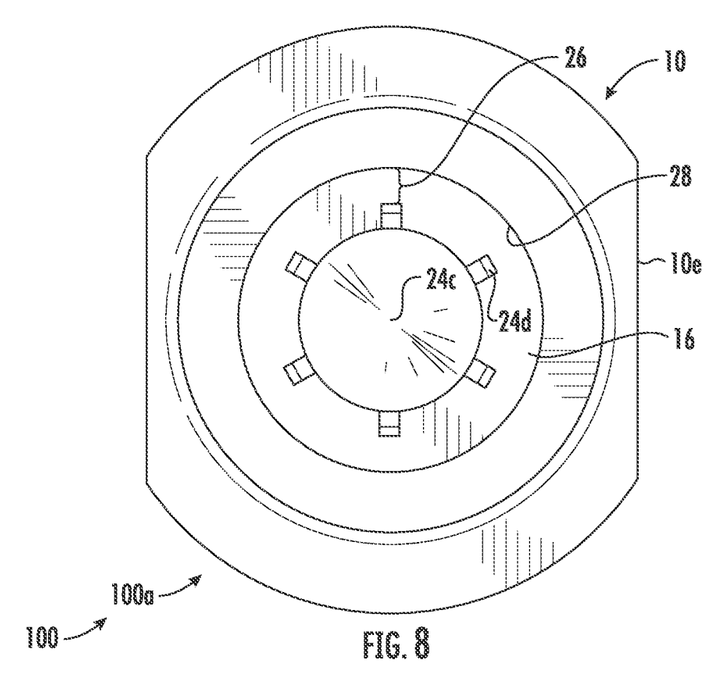
FIG. 8 is a front elevation view of the plasma igniter, showing one embodiment having protrusions extending from a distal end of the electrode towards an inner wall of the igniter body.
Figure 9:
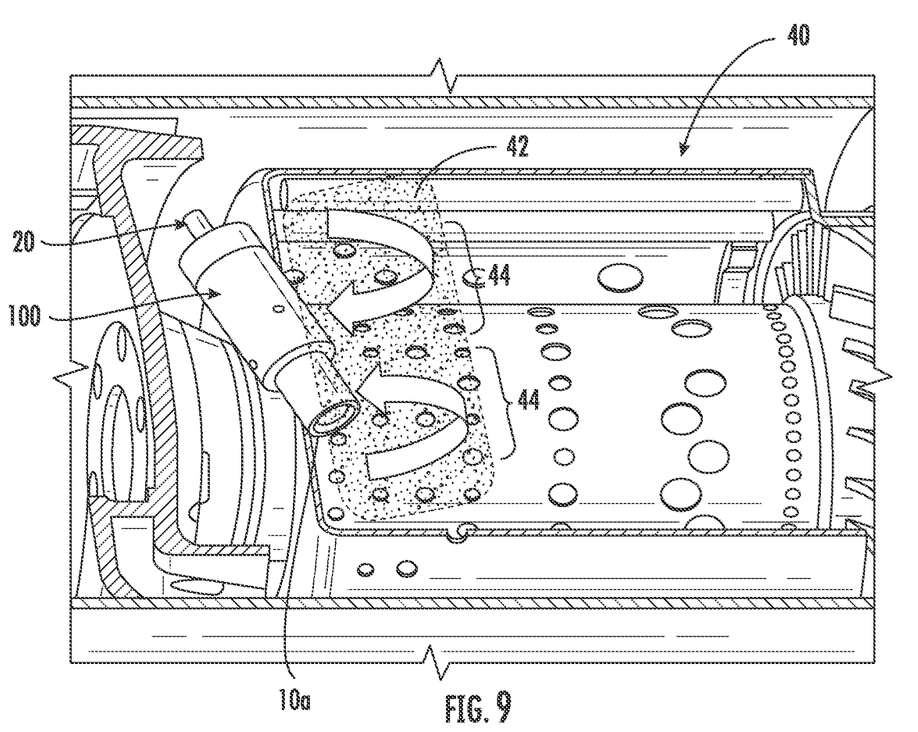
FIG. 9 is a perspective view of the plasma igniter in FIG. 1, shown in a use position with an outlet end of the igniter body directed at a primary burn region of a combustor.
Figure 10:
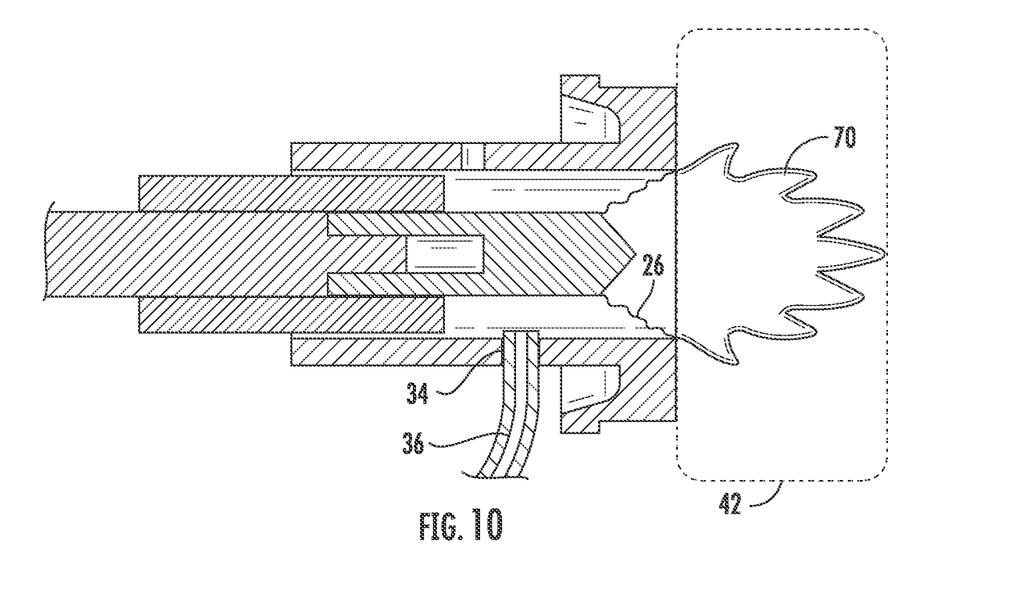
FIG. 10 is a side elevation cutaway view of the plasma igniter in FIG. 2, shown in a representative embodiment with a plasma arc generated by the plasma igniter and a flame caused by the plasma arc igniting fuel, the flame extending into the primary burn region of the combustor.

FIG. 1 shows a truncated body embodiment 100a of the igniter 100, with the distal end 24a extending beyond the outlet end 10a and into a primary burn region 42 of the combustor 40. The distal end 24a is generally conical in shape, with a terminal end or vertex 24c positioned beyond the outlet end 10a of the igniter body 10. A base of the distal end 24a is further formed with a corner 24d having a radius between zero and 0.15 inches, with a smaller radius being preferable. The inclusion of the corner 24d shortens a distance between the electrode 24 and the inner wall 28, and thus creates a constriction of the air gap 30 at the outlet end 10a. The corner 24d may in fact be of a uniform size and shape about the circumference of the distal end 24a as in FIG. 1 or may be formed as a regular series of protrusions about the circumference of the base of the distal end 24a as shown in FIGS. 6-8.

Figure 2:
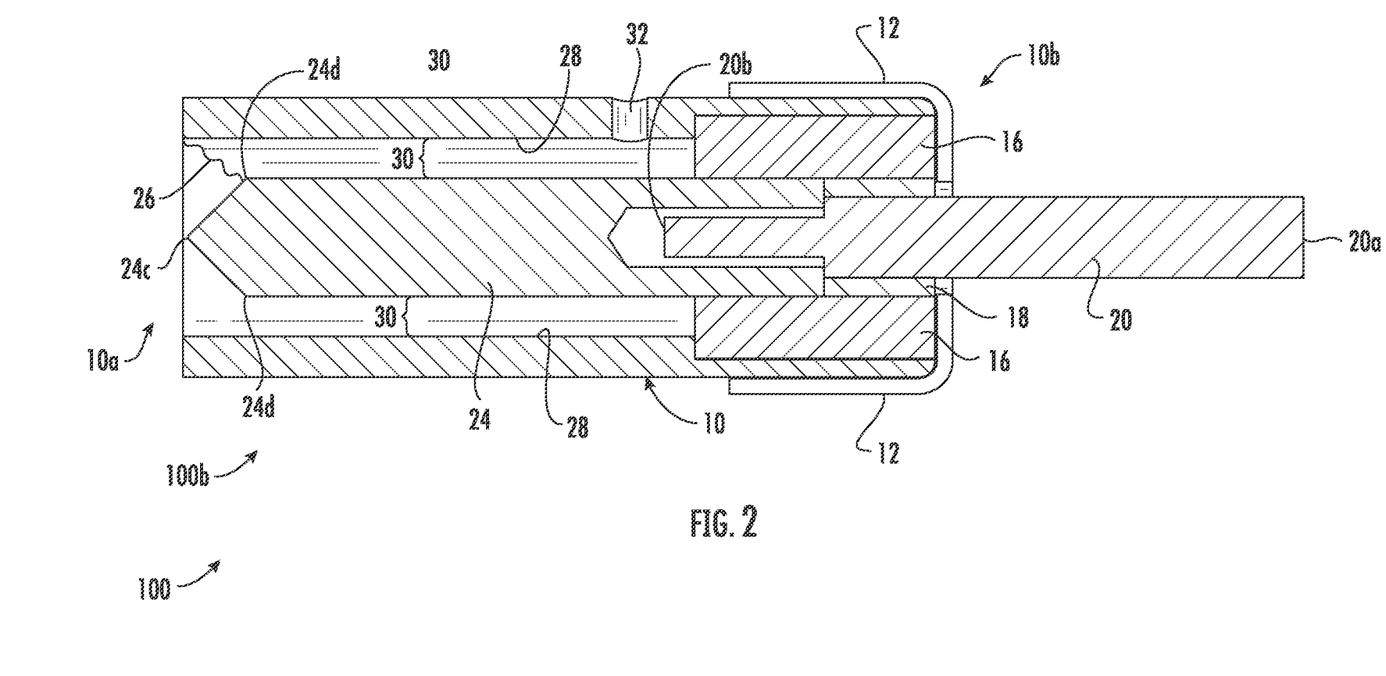
FIG. 2 is a side elevation cutaway view of a plasma igniter having an extended body of the plasma ignition and combustion assist system.
Figure 3:
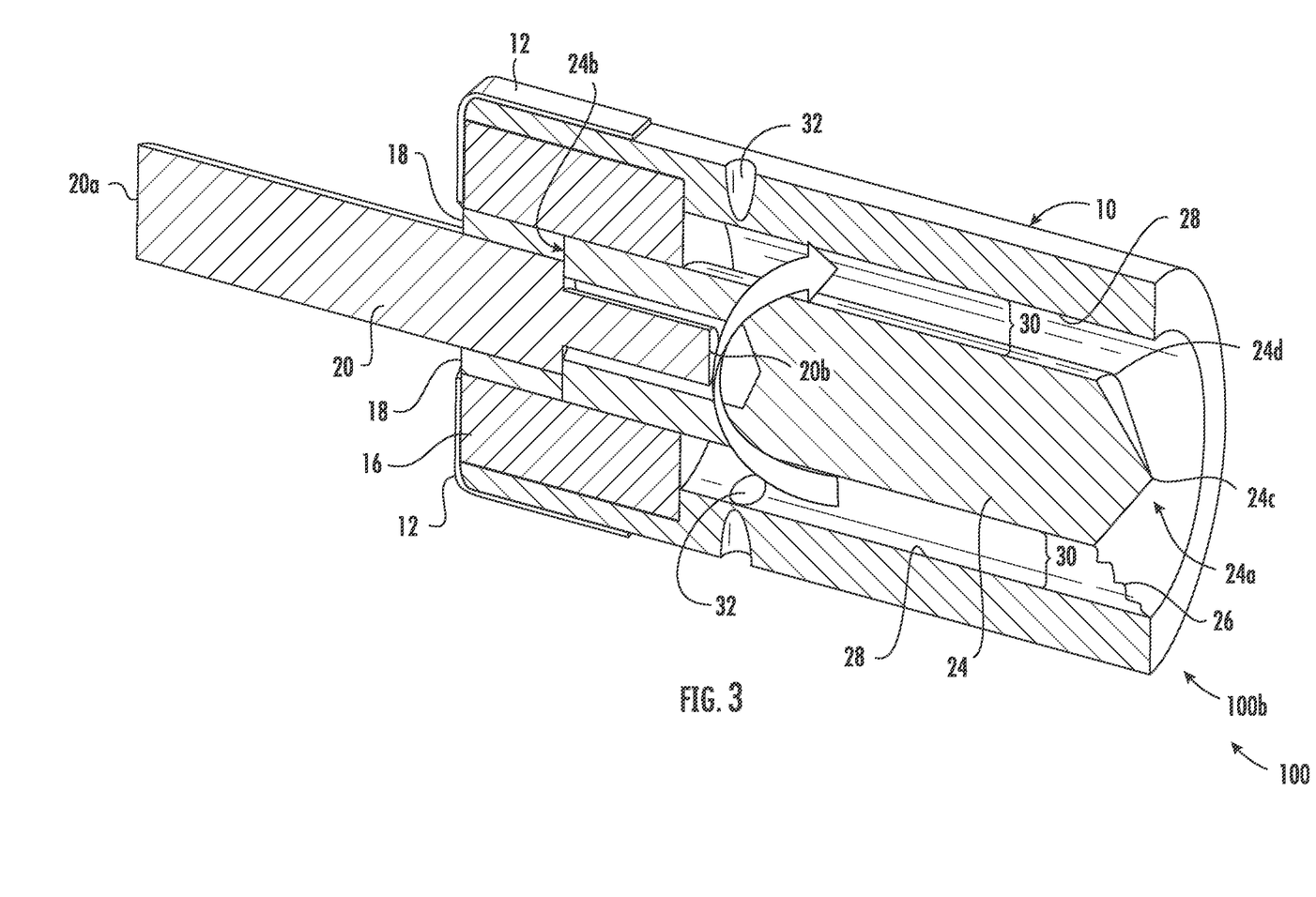
FIG. 3 is a perspective cutaway view of the plasma igniter in FIG. 2, showing a direction of air flow into the air gap.

An arc gap 26, shown in the Figures as a squiggly line, is typically a shortest distance measured from the electrode 24 to the inner wall 28, as most clearly shown in FIG. 1 with the truncated body igniter 100a, and may in fact be a same measurement as the air gap 30. Formation of a plasma arc can occur anywhere along a length of the electrode 24 to the inner wall 28, but the inclusion of the corner 24d shortens the air gap 30 distance and encourages formation of the plasma arc at the corner 24d to the inner wall 28 at that shortest distance. Hence, in the drawings, the arc gap 26 shown as the squiggly line in the Figures is also generally indicative of the plasma arc. This is advantageous for ignition of the discharge as well as for ensuring the discharge is disposed proximal to zones of at least one of a flame holding or a combustor recirculation zone 44. In all the Figures, the arc gap 26 is shown as emanating from the corner 24d to the inner wall 28 at the outlet end 10a of the igniter body 10 and in FIG. 2, this distance is not the shortest distance between the corner 24d and the inner wall 28. FIG. 2 shows the location of the arc gap 26 when there is air flow present in the air gap 30, with the air flow extending the arc gap 26 distance to the inner wall 28 at the outlet end 10a, and thus effectively moving the plasma arc formation towards the outlet end 10a. If no air is actively being fed through the air gap 30, the arc gap 26 in FIG. 2 would in fact be a shortest distance from the corner 24d to the inner wall 28 as shown in FIG. 1. Hence, the arc gap 26 distance may change depending on whether there is air flow within the air gap 30 and exiting the outlet end 10a. The inventors note that instead of having the corner 24d be configured as a protrusion to encourage arcing at that position, in other embodiments, the inner wall 28 could instead or also be designed with a flange or other protrusion constricting the outlet end 10a of the igniter body 10 with a same end result of encouraging plasma arc formation at the constriction point in the igniter body 10. The inclusion of the corner 24d on the electrode 24 at the outlet end 10a and the air flow towards the outlet end 10a optimize the plasma arc formation at the outlet end 10a such that a resulting flame 70 produced will be positioned in the primary burn region 42 of the combustor 40. When the electrode 24 receives current from the driver unit 50, the current jumps the space between the electrode 24 to the inner wall 28 at the arc gap 26, and when there is air flow in the air gap 30, the flame 70 extends from the arc gap 26 and outwards beyond the outlet end 10a into the primary burn region 42.

The truncated body igniter 100a may also have a fuel port 24 and fuel line 26 or be unfueled. For embodiments with the fuel port 24 and fuel line 26, a fuel-air mix from the fuel port 24 and the air feed hole 32 enters and swirls through the air gap 30 around the electrode 24. The plasma arc formed at the arc gap 26 ignites the fuel, creating the flame 70, and the moving air pushes the arc and the flame 70 caused by the burning fuel beyond the outlet end 10a of the igniter 100a and into the combustor 40. The igniter body 10 and the centrally positioned electrode 24 are heated by the passage of electrical current through both components and this heating enhances the processes of evaporation and break-up of fuel injected into the air gap 30.

The outer wall 10c of the truncated body igniter 100a is further formed with a widened body mount 10e, having a larger diameter compared to the outer wall 10c and sized and shaped to allow the igniter body 10 to be more easily secured to the combustor 40.

In FIG. 2, an extended igniter body 100b embodiment is shown, where the distal end 24a and vertex 24c of the electrode 24 do not extend beyond the outlet end 10a of the igniter body 10. In FIG. 2, the corner 24d is at the base of the conical distal end 24a, but the corner 24d is formed without any protrusions and the cylindrical electrode 24 at the corner 24d instead tapers to the vertex 24c. The air gap 30 has a uniform distance from the inner wall 28 to the body of the electrode 24. The arc gap 26 is shown from the corner 24d to the inner wall 28 at the outlet end 10a of the igniter body 10 and is a longer distance as compared to the arc gap 26 in the truncated body igniter 100a embodiment in FIG. 1. As previously discussed, when the igniter 100b is in use, air pumped into in the air gap 30 via the air feed hole 32 flows out the outlet end 10a of the igniter body 10 and extends the arc gap 26 distance and thus the plasma arc to what is shown in FIG. 2, with the arc gap 26 and plasma arc indicated by the squiggly line.

In comparison to the truncated body igniter 100a, typically the extended body igniter 100b includes a fuel port 34 and fuel line 36 along with the air feed hole 32.

The plasma igniter 100 and its embodiments 100a 100b are supplied voltage and current by the electronic driver unit 50, shown in FIGS. 12 and 13 as schematics of two typical embodiments of the driver units 50 and their component blocks. The driver unit 50 provides electrical power to the plasma igniter 100 100a 100b. The driver unit 50 supports the generation of a sufficiently high electric field so that an electrical arc is generated between the electrode 24 and the inner wall 28 of the igniter torch body 10. The arc gap 26 and an electrode geometry are design parameters that affect the voltage level required. The larger the arc gap 26, the higher the voltage requirement. The timing for triggering the plasma arc is not a critical requirement in these systems since the frequency of the voltage wave and resulting arcs are effectively continuous, as shown in FIG. 11. Wave time, measured as 1/frequency, is shorter than the effective combustor residence time, typically 0.5 to 30 msec. Electrical power and voltage are dependent on the required ignition energy for the combustor 40. Typical levels range from 100 to 500 Watts (RMS power input to the system). The delivered energy at the arc gap 26 is typically 5 to 10 times lower than the power input. However, the inventors note these parameters may vary without limitation and one with ordinary skill in the art would recognize that changes in these parameters outside of these typical levels do not negate the novelty or usefulness of this invention.

FIG. 12 shows a first embodiment of the driver unit 50, with a schematic of the plasma ignition driver unit 50 with component blocks. The power input 52 can be either alternating or direct current. Most aircraft systems use 28 Vdc power, and thus this is a preferred power input. A voltage output 62 is dependent on the driver unit 50 output frequency, which can range from 5 kHz to 100 MHz. Voltage output levels will range from 250 Vrms to 7000 Vrms. Peak voltage levels may be significantly higher. As shown in FIG. 12, there are two basic component blocks in the driver unit 50, an input power controller 56 to regulate, filter and modulate the input power 52 and a voltage oscillator 64 to create a voltage waveform at the correct frequency and level with a transformer to generate the high voltage required for arcing at the igniter 100. The driver unit 50 also has a triggering input 52, configured as an on/off signal in a simplest form, and connections with safety fuses and EMI shielding to reduce electromagnetic noise from the driver unit 50.

FIG. 13 shows a second embodiment of the driver unit 50. In this system, a simple zero-voltage switching unit 58 is used along with a voltage step-up transformer or flyback transformer 60. This circuitry is common and used in applications where different DC voltage levels are needed. The transformer 60 steps up the voltage from the primary side voltage to a higher voltage necessary for generating plasma. This step up ratio can be customized to best suit engine operating parameters and is controlled by the primary to secondary windings ratio of the transformer, the flux coupling and inductive effects. The circuit can be tuned to a particular frequency, and a higher frequency is usually preferred for plasma igniter systems. The simplicity and availability of low-cost components in the driver unit 50 make this a desirable means for plasma igniter power input. The input power controller 56 could be a complex voltage and current regulation system, or a simple passive circuit with a single state for input and output.

The driver units 50 supply voltage and current to the plasma igniter 100 100*a* 100*b* such that there is a transient rate of voltage rise sufficient to create the electrical arc from the corner 24*d* of the electrode 24 to the inner wall 28 of the grounded igniter body 10. The two types of driver units 50 used in this system include a low-cost AC driver unit 50 with a microsecond voltage wave time period, and a high-cost, energy-efficient nano-second pulse driver unit 50. Either driver unit 50 shown in FIGS. 12 and 13 can be configured to be low-cost (microsecond voltage wave) or energy-efficient (nano-second pulse), however the high-cost, energy-efficient driver unit 50 requires relatively more expensive electronics with faster switching capability and may or may not require a physically larger unit. Thus, either igniter 100*a* 100*b* may be driven by either electronic driver unit 50. A single engine may have multiple igniters 100 and driver units 50, with a minimum one igniter 100 and one driver unit 50 per engine. The type of driver unit 50 used is dependent on the desired cost and use of the system. The AC driver unit 50 is low-cost and more appropriate for engine ignition where activation is required for only a short period of time, typically less than one minute. The nano-second pulse driver unit 50 is more power-efficient. Either driver unit 50 can be used for ignition, re-start and combustion sustainment, efficiency enhancement, and in conditions where mixing and reaction times are short or where the fuel-air mixture in the combustor burn zone is outside conventional lean and rich flammability limits. These systems are capable of multiple engine starts, unlike pyrotechnic or flare devices used in conventional military unmanned systems and are desired for periods longer than 5 minutes and where the system cost trades well against improved engine operational envelope and fuel efficiency.

In short, the low-cost and high-cost (energy efficient) designs are both DC powered. The circuitry to drive the arc formation is the difference between these driver units. In the low-cost design, the arc is produced by an AC voltage switching circuit with a simple step-up transformer. In the high-cost design, the voltage step up is done with high frequency switching components with different voltage amplifiers (solid state devices). The high-cost design is used for higher efficiency and better performing arc characteristics, such as faster, easier arcing with more active ion generation.

For driver units 50 with a direct current power source with a voltage level between 10 Vdc and 120 Vdc, the driver unit 50 provides current to a circuit generating a variable or constant frequency voltage wave at about 10 kHz to 10000 kHz. The input power controller 56 can be configured as a passive circuit with a single state for input and output or as a voltage and current regulation system. For the driver unit 50 in FIG. 12, a voltage level increase of 100 to 1000 times the input voltage via the voltage transformer 64 is produced by an inductive electrical coil, or alternatively by a set of energy storage capacitors to achieve the oscillating voltage increase.

The plasma ignition and combustion assist system is applicable to a wide range of gas turbines. The full range includes both ground power systems as well as aircraft engines. The system described herein is expected to be lower cost than conventional spark ignition systems. In 2021, a low-cost system is approximately less than $500 USD and a high-cost system is more than $2500 USD. In comparison, a conventional spark ignition system in 2021 costs between $4000-7000 USD. The plasma igniter 100 100*a* 100*b* and driver unit 50 of the plasma assist system described herein produces a continuous or pulsed arc that does not require expensive nor complex triggering electronics, and the voltage required to sustain the plasma arc is several factors lower than for spark ignition systems, which reduces the need for complex isolation leads and connectors.

Plasma assist ignition is best applied to small or miniature gas turbines, which must be capable of operation with short combustor residence times. These engines are characterized by low pressure ratio with low combustor inlet pressure (pressure levels below about 125 psia) and temperatures below 400 F, and with overall residence time (volume/volumetric-flow-rate) below about 15 msec. Larger, higher pressure ratio engines having overall pressure ratios above 7:1 would benefit from the plasma igniter 100 and driver unit 50 described herein but typically have higher voltage, single-spark, systems. Plasma assist systems based on the plasma igniters 100 and the driver units 50 described herein can benefit large ground power systems mostly by running continuously during operation thereby improving lean stability and allowing stable operation at conditions consistent with lower nitrogen oxides (NOx) and carbon monoxide (CO) emissions.

Typical engines for which the plasma ignition and combustion assist system is useful include the following:

1. Miniature turbojets with thrust ranging from 15 lbf to 600 lbf. These are generally used in flight systems (such as miniature missiles, surveillance aircraft/drones, airborne jamming devices and commercial drones). These engines use a range of heavy distillate fuels including Jet-A, Diesel and JP-10. Current engine models suitable for use with the plasma assist system include the ATI070, and all derivatives of the B300STG turbojet and the ATI200, a 200 lbf thrust turbojet. For these engines, the plasma ignition and combustion assist system would be used for ignition and engine start/operational envelope expansion with low engine speeds and/or power levels at altitude. The plasma ignition and combustion assist system allows for multiple starts and/or re-starts in flight; and 2. Miniature high speed turbo-generators in the 5 to 100 kW electrical power output range. These generators are most commonly airborne power systems used for small, unmanned commercial and military aircraft where high power/weight is needed. Other suitable applications of the plasma ignition and combustion assist system include those where high power in a small, lightweight package is required, including small ground power units. Current engine models suitable for use with the plasma assist system include the ATI010e, a derivative of the B140TG and SP10e, which are both 10 kWe turbo-generators, the ATI35e, a derivative of the B300STG 35 kWe turbo-generator, and the SP75e, a 75 kWe turbo-generator. For these engines, the plasma ignition and combustion assist system is used for ignition and starting. The system in this application allows for multiple starts and/or re-starts during flight.

Engines suitable for use with the plasma ignition and combustion assist system have relatively low overall pressure ratios of 3:1 to 7:1, and where plasma arcing in air is relatively easy due to low air densities and reduced voltage required for electrical arc initiation.

It is to be understood that the above-described arrangements are only illustrative of the application of the principles of the present invention. Numerous modifications and alternative arrangements may be devised by those skilled in the art without departing from the scope of the present invention.

We claim:

1. A method of using a plasma igniter with an electronic driver unit, the method comprising the steps of:
   determining at least one of a desired size and weight of a plasma igniter based on engine size, space availability or kinetic application;
   determining a desired igniter electrode operating life;
   determining a desired power efficiency of the plasma igniter system;
   maintaining a power source compatibility of the plasma igniter system with that of an engine;
   determining engine pressure ratios;
   wherein the step of determining engine pressure ratios further comprises the steps of:
     identifying engines having low pressure ratios between 3:1 and 7:1, small volumetric flow rates below 15 msec, and operating at temperatures below 400 Fahrenheit; and
     selecting electronic driver units with voltage outputs appropriate for at least one of the respective pressure ratios and volumetric flow rates, after the step of determining engine pressure ratios; and
   determining whether the plasma igniter and driver unit will be operational only at initial ignition and start of the engine or at multiple times after initial ignition and start of the engine; and
   operating the plasma igniter to sustain combustion or increase combustion efficiency when conditions where mixing and reaction times are short or where the fuel-air mixture in the combustor burn zone is outside conventional lean and rich flammability limits; after the step of determining whether the plasma ignition system will be operational at initial ignition and start of the engine only, or multiple times after initial ignition and start.

2. The method in claim 1, for use with a turbojet with thrust ranging from about 15 to 600 lbf.

3. The method in claim 1, for use with a turbo-generator having a 5 to 100 kW electrical power output.

4. The method in claim 1, for use with a plasma igniter comprising:
   an igniter body having a lead end and an opposed outlet, with an inner wall defining a chamber between the lead end and the outlet end;
   wherein the outlet end of the igniter body is an open end of the chamber positioned near a primary burn region of a combustor;
   wherein the igniter body is electrically grounded to the combustor;
   an electrode having a proximal end and at least one of a conical and cylindrical distal end housed centrally inside the chamber and electrically isolated from the inner wall of the igniter body;
   wherein the distal end is further comprised of a terminal end positioned towards the outlet end of the igniter body;
   wherein the distal end is further formed with at least one corner having a corner radius ranging from zero to 0.15 inches;
   an arc gap of a predetermined size measured from the corner to the inner wall of the igniter body;
   wherein the arc gap is a distance selected from the group of distances including a smallest distance from the corner of the electrode to the inner wall of the igniter body and a smallest distance from the corner to the inner wall at the outlet end of the igniter body;
   an approximately annular air gap between the electrode and the inner wall;
   an electrical lead having an electrode end and a power end, the electrode end affixed inside the electrode at the proximal end and the power end connected to the driver unit, whereby an electrical current is supplied to the electrical lead and electrode by the driver unit; and
   an air feed through-hole formed through the igniter body and into the air gap, whereby air flows into the air feed through-hole and into the arc gap and out the outlet end of the igniter body.

* * * * *